United States Patent
Mallinson et al.

(10) Patent No.: US 9,256,269 B2
(45) Date of Patent: Feb. 9, 2016

(54) SPEECH RECOGNITION SYSTEM FOR PERFORMING ANALYSIS TO A NON-TACTILE INPUTS AND GENERATING CONFIDENCE SCORES AND BASED ON THE CONFIDENCE SCORES TRANSITIONING THE SYSTEM FROM A FIRST POWER STATE TO A SECOND POWER STATE

(71) Applicants: Dominic S. Mallinson, Redwood City, CA (US); Ruxin Chen, Redwood City, CA (US)

(72) Inventors: Dominic S. Mallinson, Redwood City, CA (US); Ruxin Chen, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 371 days.

(21) Appl. No.: 13/791,716

(22) Filed: Mar. 8, 2013

(65) Prior Publication Data
US 2014/0237277 A1    Aug. 21, 2014

Related U.S. Application Data

(60) Provisional application No. 61/767,065, filed on Feb. 20, 2013.

(51) Int. Cl.
*G06F 1/00* (2006.01)
*G06F 1/32* (2006.01)

(52) U.S. Cl.
CPC ............ *G06F 1/3206* (2013.01); *G06F 1/3203* (2013.01)

(58) Field of Classification Search
CPC .... G10L 15/265; G06F 1/3203; G06F 1/3206
USPC ......... 704/275, 231, 233, 236, 235, 230, 257, 704/251, 9; 340/5.84
See application file for complete search history.

(56) References Cited

U.S. PATENT DOCUMENTS

| | | | | |
|---|---|---|---|---|
| 6,070,140 | A * | 5/2000 | Tran | 704/275 |
| 7,039,951 | B1 * | 5/2006 | Chaudhari | G10L 17/06 340/5.84 |
| 8,803,975 | B2 * | 8/2014 | Haupt et al. | 348/161 |
| 8,860,890 | B2 * | 10/2014 | Jang et al. | 348/730 |
| 8,972,252 | B2 * | 3/2015 | Hung et al. | 704/230 |

(Continued)

OTHER PUBLICATIONS

"Advanced Configuration and Power Interface Specification", Hewlett-PackardCorp. et al., Revision 4.0a, Apr. 2005.

(Continued)

*Primary Examiner* — Chun Cao
*Assistant Examiner* — Aurel Prifti
(74) *Attorney, Agent, or Firm* — Joshua D. Isenberg; JDI Patent

(57) ABSTRACT

Aspects of the present disclosure describe methods and apparatuses for executing operations on a client device platform that is operating in a low-power state. A first analysis may be used to assign a first confidence score to a recorded non-tactile input. When the first confidence score is above a first threshold an intermediate-power state may be activated. A second more detailed analysis may then assign a second confidence score to the non-tactile input. When the second confidence score is above a second threshold, then the operation is initiated. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

34 Claims, 5 Drawing Sheets

(56) References Cited

U.S. PATENT DOCUMENTS

| | | | |
|---|---|---|---|
| 2004/0128137 A1* | 7/2004 | Bush et al. | 704/275 |
| 2006/0068851 A1* | 3/2006 | Ashman, Jr. | 455/566 |
| 2006/0116876 A1* | 6/2006 | Marcus | 704/231 |
| 2006/0149544 A1* | 7/2006 | Hakkani-Tur | G10L 15/22 704/236 |
| 2007/0094486 A1* | 4/2007 | Moore et al. | 713/1 |
| 2008/0133228 A1* | 6/2008 | Rao | 704/231 |
| 2008/0201133 A1* | 8/2008 | Cave | G10L 15/1815 704/10 |
| 2009/0037175 A1* | 2/2009 | Wang | G10L 15/1822 704/251 |
| 2009/0076798 A1* | 3/2009 | Oh | G06F 17/279 704/9 |
| 2009/0259466 A1 | 10/2009 | Stubley et al. | |
| 2010/0066684 A1* | 3/2010 | Shahraray et al. | 345/173 |
| 2010/0185448 A1* | 7/2010 | Meisel | 704/256.1 |
| 2011/0211746 A1* | 9/2011 | Tran | 382/137 |
| 2012/0059845 A1* | 3/2012 | Covell et al. | 707/769 |
| 2012/0215537 A1* | 8/2012 | Igarashi | 704/249 |
| 2012/0221330 A1* | 8/2012 | Thambiratnam et al. | 704/235 |
| 2012/0317085 A1* | 12/2012 | Green et al. | 707/704 |
| 2012/0323573 A1* | 12/2012 | Yoon et al. | 704/236 |
| 2013/0110521 A1 | 5/2013 | Hwang et al. | |
| 2013/0132086 A1* | 5/2013 | Xu et al. | 704/257 |
| 2013/0155237 A1* | 6/2013 | Paek et al. | 348/148 |
| 2013/0229508 A1* | 9/2013 | Li et al. | 348/77 |
| 2013/0339028 A1* | 12/2013 | Rosner et al. | 704/275 |
| 2014/0278394 A1* | 9/2014 | Bastyr et al. | 704/233 |
| 2014/0278435 A1* | 9/2014 | Ganong et al. | 704/275 |

OTHER PUBLICATIONS

International Search Report and Written Opinion for International Application No. PCT/US2014/016951, dated Aug. 14, 2014.

U.S. Appl. No. 61/767,065, to Dominic S. Mallinson, filed Feb. 20, 2013.

* cited by examiner

SPEECH RECOGNITION SYSTEM FOR PERFORMING ANALYSIS TO A NON-TACTILE INPUTS AND GENERATING CONFIDENCE SCORES AND BASED ON THE CONFIDENCE SCORES TRANSITIONING THE SYSTEM FROM A FIRST POWER STATE TO A SECOND POWER STATE

CLAIM OF PRIORITY

This application is a nonprovisional of U.S. Provisional Patent Application No. 61/767,065, filed Feb. 20, 2013, the entire disclosures of which are incorporated herein by reference.

FIELD OF THE DISCLOSURE

Aspects of the present disclosure are related to the use of speech and gesture recognition in a low-power environment.

BACKGROUND OF THE DISCLOSURE

Many electronic devices, such as, but not limited to computers, televisions, gaming consoles, and stereo systems, utilize low-power states in order to reduce energy consumption when not in use. Low-power states are able to reduce the power consumption of the electronic devices by cutting off power to unnecessary subsystems and placing the random access memory (RAM) into a minimum power state that is just sufficient to retain its data. The state information of each subsystem is stored in the RAM. Therefore, once the electronic device is brought out of the low-power state, the device may be immediately ready for use again without having to reboot or load applications that were running before the low-power mode was initiated. Low-power states, such as the S3 Sleeping State, are described in further detail in the "Advanced Configuration and Power Interface Specification", Hewlett-Packard Corp. et al., Revision 4.0a, April 2005, and incorporated herein by reference.

However, once in a low-power state, a device typically requires an affirmative tactile input to "wake up" the electronic device and return to the normal full-power state. By way of example, affirmative tactile inputs may include pressing a power button, or striking a key on a keyboard or a button on a remote control. An affirmative tactile input is needed to restore the electronic devices to their normal operating state because the processing power is greatly reduced in the low-power state. Alternative inputs, such as audio or visual cues have not been options because complex speech and gesture recognition require too many CPU cycles to function as a reliable indication of an affirmative desire to awaken the electronic device. As such, if a user wants to wake up an electronic device from a low-power state, then the user must physically touch the electronic device or a remote control for the electronic device. If the electronic device is located across the room and the remote control is lost, then the user must exert extra physical motion to move across the room in order to activate the electronic device.

Therefore, there is a need in the art for systems and methods that reduce the burden on the user by allowing electronic devices to be woken up from a low-power state with inputs that do not require physically touching the electronic device or the remote control.

It is within this context that aspects of the present disclosure arise.

BRIEF DESCRIPTION OF THE DRAWINGS

The teachings of the present invention can be readily understood by considering the following detailed description in conjunction with the accompanying drawings, in which.

DETAILED DESCRIPTION

Figure 1:
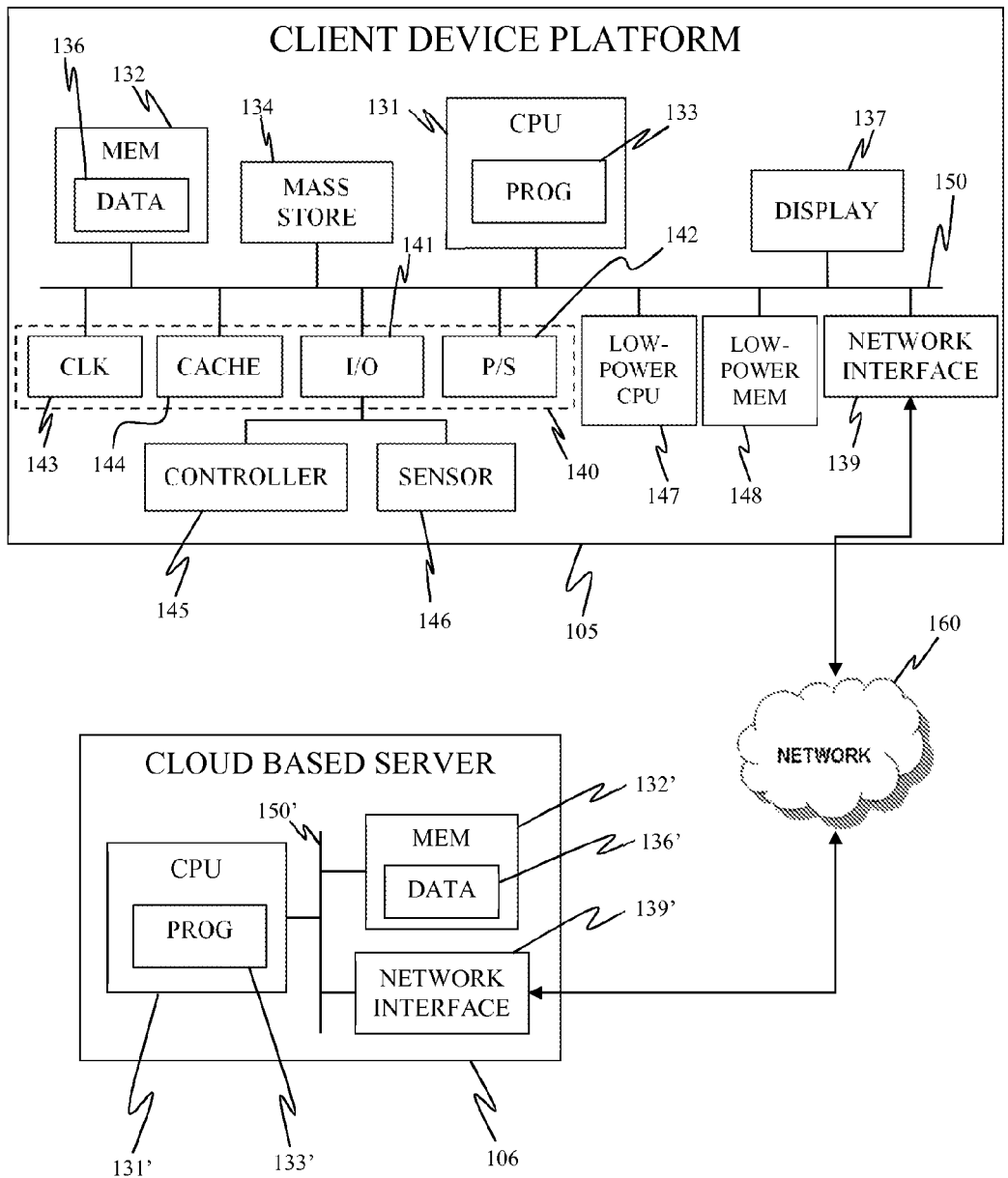
FIG. 1 is schematic diagram of a client device platform and a cloud based server communicating over a network according to an aspect of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

Aspects of the present disclosure describe systems and methods for executing an operation on a client device platform that is in a low-power state with the use of non-tactile inputs. As used herein, the term "non-tactile input" generally refers to an input that does not require a user to make physical contact with an input device. Examples of such non-tactile inputs include, but are not limited to, audio inputs, which may be received, e.g., via a microphone, and optical inputs, which may be received, e.g., by an optical sensor or image capture device. Other types of "non-tactile" inputs include, but are not limited to smell sensors, infrared sensors, ultra-sound sensor, capacitive sensing, motion sensor, and radar sensors.

In a client device platform the low-power state may comprise providing power to at least a low-power processor, one or more sensors, and a low-power memory. The one or more sensors may record non-tactile inputs and store them on the low-power memory. The low-power processor is configured to run a first analysis on the recorded non-tactile inputs. The first analysis may provide a first confidence score that indicates the likelihood that the recorded non-tactile input is an input that matches a first reference input. If the confidence score is above a first threshold value, then the low-power processor may instruct the client device platform to initiate an intermediate-power state. The intermediate-power state may comprise providing power to a second processor. The second processor may have more CPU cycles than the low-power processor, but fewer CPU cycles than when the client device platform is running in a full-power state.

Once the second processor is activated, it may perform a second analysis that compares the non-tactile input to the first reference stimulus. Since the second analysis is performed with additional CPU cycles, it is capable of providing a more accurate prediction of whether the non-tactile input matches the first reference signal. A second confidence value is determined by the second analysis. If the second confidence score is above a second threshold value, then the second processor may generate a command signal that instructs the client device platform to execute one or more operations. Each of the one or more operations may be associated with a specific first reference signal. By way of example, and not by way of limitation, if the first reference signal is the phrase "Device On", then the operation that is associated with the first reference signal may cause the client device platform to initiate a full-power state. Therefore, if a non-tactile input has a second confidence score that is above a second threshold level, when compared to the reference input "device on", then a command signal may be generated that instructs the client device platform to execute the operation that causes the client device platform to initiate a full-power state.

According to an additional aspect of the present disclosure, the first analysis may be made with a first reference signal, and the second analysis may be made with a second reference signal. The first reference signal may be shorter than the second reference signal. Therefore, less data needs to be stored on the low-power memory in order to analyze the signal. By way of example, and not by way of limitation, the first reference signal may be used to determine if a human voice has been detected, or if a short phrase, such as "device on" has been spoken by a user. The second reference signal may be longer, and may be associated with a more complex operation. By way of example, the second reference signal may be used to determine if a human voice has spoken the phrase, "device on—play video game one". If that phrase is matched with a sufficiently high second confidence value then a command signal may be generated that instructs the client device platform to execute a more complex operation, such as initiating a full-power state on the client device platform, and loading video game one so it is ready to be played by a user.

According to an additional aspect of the present disclosure, the second analysis may be implemented on a cloud-based server. When the first analysis produces a first confidence score that is above the first threshold value, the client device platform may deliver the non-tactile input to the cloud-based server over a network. The second analysis is then performed on the cloud-based server. If the second analysis produces a second confidence score that is higher than the second threshold value, then the cloud-based server may deliver a command back to the client device platform over the network that instructs it to execute the one or more operations associated with the reference signal.

FIG. 1 is a schematic diagram illustrating interaction between a client device platform 105 and a cloud-based server 106 according to aspects of the present disclosure. The cloud-based server 106 may be accessed by a client device platform 105 over a network 160.

The client device platform 105 may include a central processor unit (CPU) 131. By way of example, a CPU 131 may include one or more processors, which may be configured according to, e.g., dual-core, quad-core, multi-core, or Cell processor architecture. The client device platform 105 may also include a memory 132 (e.g., RAM, DRAM, ROM, and the like). The CPU 131 may execute a process-control program 133, portions of which may be stored in the memory 132. The client device platform 105 may also include well-known support circuits 140, such as input/output (I/O) circuits 141, power supplies (P/S) 142, a clock (CLK) 143 and cache 144. The client device platform 105 may optionally include a mass storage device 134 such as a disk drive, CD-ROM drive, tape drive, or the like to store programs and/or data. The client device platform 105 may also optionally include a display unit 137. The display unit 137 may be in the form of a cathode ray tube (CRT) or flat panel screen that displays text, numerals, or graphical symbols. A controller 145 may be connected to the client device platform 105 through the I/O circuit 141 or it may be directly integrated into the client device platform 105. The controller 145 may facilitate interaction between the client device platform 105 and a user. The controller 145 may include a keyboard, mouse, joystick, light pen, hand-held controls or other device. One or more sensors 146 may also be connected to the client device platform 105 through the I/O circuit 141 or they may be directly integrated into the client device platform 105. By way of example, and not by way of limitation, the sensor 146 may be a microphone, a video camera, an infrared camera, a terahertz sensor, or any other sensing device. The client device platform may have a low-power processor 147 and a low-power memory 148. The low-power processor 147 and the low-power memory may operate when the client device platform 105 is in a low-power state, such as a sleep state. The low-power processor 147 may be a single core processor that only has minimal processing power in order to minimize power consumption during the low power state. By way of example, the low-power processor 147 may be an ARM processor. Alternatively, the low-power processor 147 may be one or more cores of a multi-core CPU 131. Additionally, the low-power memory 148 may be sufficiently small in order to minimize the consumption of power. The client device platform 105 may include a network interface 139, configured to enable the use of Wi-Fi, an Ethernet port, or other communication methods.

The network interface 139 may incorporate suitable hardware, software, firmware or some combination of two or more of these to facilitate communication via an electronic communications network 160. The network interface 139 may be configured to implement wired or wireless communication over local area networks and wide area networks such as the Internet. The client device platform 105 may send and receive data and/or requests for files via one or more data packets over the network 160.

The preceding components may exchange signals with each other via an internal system bus 150. The client device platform 105 may be a general purpose computer that becomes a special purpose computer when running code that implements embodiments of the present invention as described herein. By way of example, and not by way of limitation, the client device platform 105 may be a gaming console, such as Sony Computer Entertainment's PlayStation 3 console, a home entertainment system, a television, or an audio system, or any other similar device.

The cloud-based server 106 may include a central processor unit (CPU) 131'. By way of example, a CPU 131' may include one or more processors, which may be configured according to, e.g., dual-core, quad-core, multi-core, or Cell processor architecture. The cloud-based server 106 may also include a memory 132' (e.g., RAM, DRAM, ROM, and the like). The CPU 131' may execute a process-control program 133', portions of which may be stored in the memory 132'. The cloud-based server 106 may include a network interface 139', configured to enable the use of Wi-Fi, an Ethernet port, or other communication methods. The network interface 139' may incorporate suitable hardware, software, firmware or some combination of two or more of these to facilitate communication via an electronic communications network 160. The network interface 139' may be configured to implement wired or wireless communication over local area networks and wide area networks such as the Internet. The cloud-based server 106 may send and receive data and/or requests for files via one or more data packets over the network 160. By way of example, and not by way of limitation, the cloud-based server may be an Amazon Elastic Compute Cloud available from Amazon Web Services.

Figure 2:
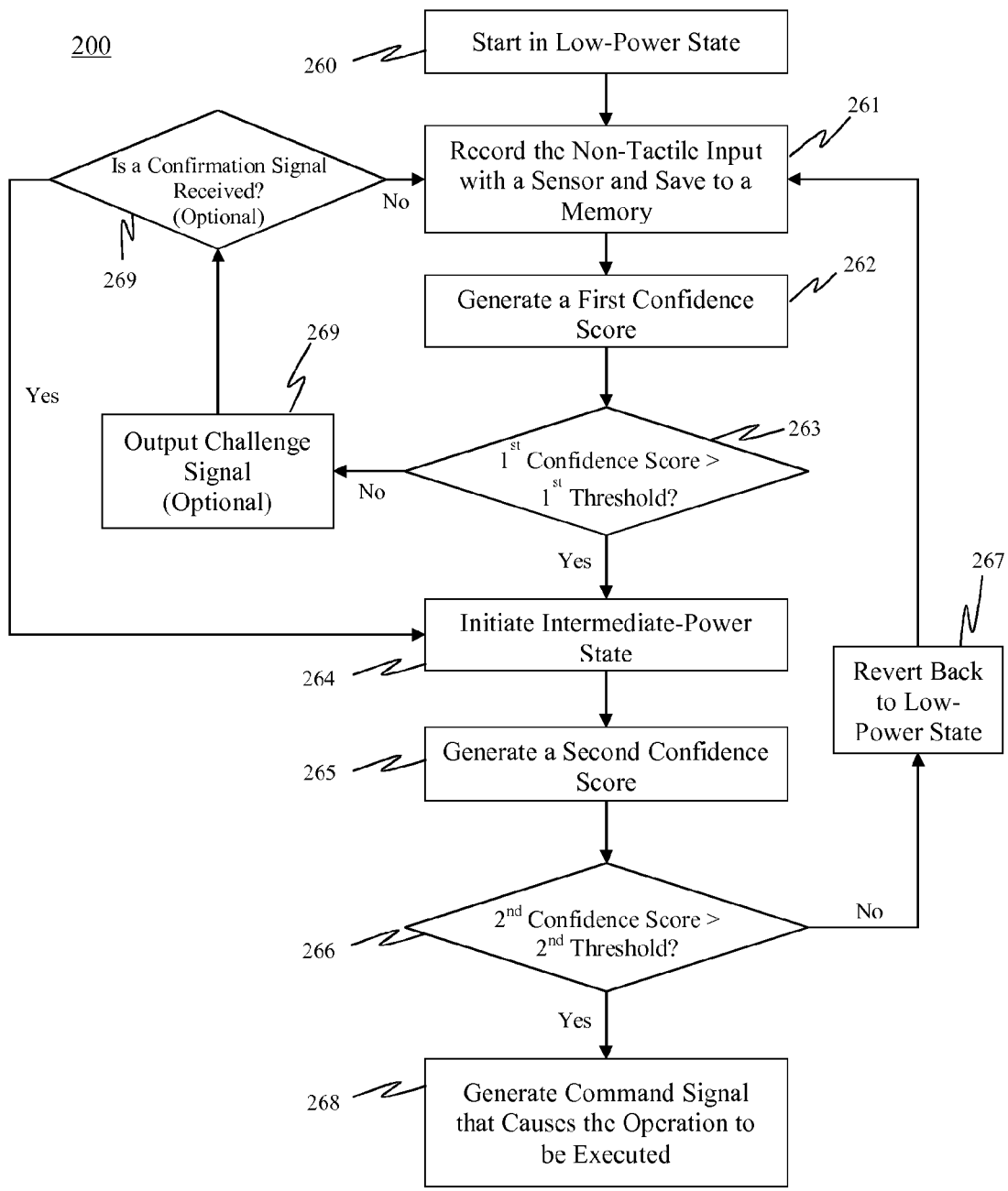
FIG. 2 is a flow diagram depicting a method of executing an operation while the client device platform is in a low-power state according to an aspect of the present disclosure.

FIG. 2 is a flow diagram describing a process for implementing one or more operations that are initiated by a non-tactile input signal that is detected by the client device platform 105 while the client device platform 105 is in a low-power state according to an aspect of the present disclosure. Initially, at 260 the client device platform 105 is in a low-power state. While in the low-power state, the client device platform 105 may be providing power to components such as, but not limited to, the low-power processor 147, the low-power memory 148, the network interface 139, the I/O circuit 141, the controller 145 and/or the one or more sensors 146. Since the I/O 141 is typically located on the south bridge, it may be desirable to design the client device platform 105 such that as many of the aforementioned components are located on the south bridge as well. By way of example, the low-power state may be a sleep state or a standby state such as the S3 Sleeping State described in the Advanced Configuration and Power Interface Specification.

While in the low-power state, the client device platform 105 may continuously record non-tactile inputs with the one or more sensors 146 and save them in an available memory, such as the low-power memory 148 as shown at block 261. By way of example, and not by way of limitation, the one or more sensors 146 may comprise a microphone, a video camera, an infrared camera, a terahertz sensor, or any combination thereof. The type of non-tactile inputs that are recorded by the one or more sensors 146 are dependent on the type of sensor(s) 146 being used. By way of example, if the sensor 146 is a microphone, then the non-tactile input may be a recording of ambient sound; if the sensor 146 is a video camera, then the non-tactile input may be a video recording of the space proximate to the client device platform 105. If the sensor 146 is an infrared camera, then the non-tactile input may be recorded infrared information from the space proximate to the client device platform 105; or if the sensor 146 is a terahertz sensor, then the non-tactile input may be recorded terahertz information from the space proximate to the client device platform 105. It is noted that the input can be a combination of the different types of inputs include combinations of the examples discussed above.

In some implementations, the sensor 146 may also be connected directly to the low power CPU 147, since in the low power mode, the low power CPU performs the computation and may control network access.

In order to minimize the amount of memory needed for storing the non-tactile inputs, the non-tactile inputs may be stored in a ring buffer on the low power memory 148 that has a duration that matches the longest expected time it may take for a user to generate a non-tactile input that corresponds to a reference signal that will initiate a desired operation. There may be one or more reference signals that are stored in the low power memory 148. Each of the reference signals may each be associated with one or more operations. By way of example, and not by way of limitation, a reference input may contain the phrase "Device On" which in turn corresponds to the operation of waking up the client device platform 105 from the low power state and initiating a full-powered state.

Software on low power CPU 147 may process the sensor data and save it in a compact smaller memory fashion that is adequate for future use on main CPU 133 or network CPU 131 for further processing. It is not necessary the reference signal itself to be stored in the low power memory.

The reference input for speech recognition can be done in a number of ways. Pure text is one possible way, but perhaps not the most reliable since it needs to be machine processed and converted to a phonetic representation. For common words, the translation of English text to phonetic may be acceptable, but non-dictionary words can be poor. The phonetic representation may be used directly in the form of a computer-readable phonetic script. Examples of computer-readable phonetic scripts include Speech Assessment Methods Phonetic Alphabet (SAMPA) and Extended Speech Assessment Methods Phonetic Alphabet (X-SAMPA). SAMPA and X-SAMPA use 7-bit printable ASCII characters based on the International Phonetic Alphabet (IPA). It is also possible to train the recognizer using an entire phrase instead of splitting the phrase into phonemes. In such a case, training may be done with a large sample of different speakers and not a single audio recording. The result of training is a kind of classifier such as a Hidden Markov Model or in some cases a neural network. Bottom line, there are many ways to do this within the domain of speech recognition.

When the non-tactile input is determined to be sufficiently similar to the reference signal, then a command signal will be generated that causes the client device platform 105 to execute the operation that corresponds to the reference signal. Additionally, while sacrificing the fidelity of the recorded non-tactile inputs may reduce the amount of memory needed, it should be noted that the fidelity should be maintained sufficiently high in order to allow for high accuracy analysis of the non-tactile inputs during subsequent processing steps. Once the non-tactile inputs have been recorded, they are then analyzed with one or more analyses in order to determine if they match one or more of the reference inputs stored on the memory accessible to the client device platform 105 in the low-power state.

The low-power processor 147 may implement a first analysis on the non-tactile inputs that have been stored in the low-power memory 148 in order to generate a first confidence score as shown at block 262. The first analysis may be implemented through the use of one or more algorithms that are used to produce the first confidence score. The first confidence score corresponds to a degree of similarity between the recorded non-tactile inputs and the one or more reference inputs that are stored on the low-power memory 148. By way of example, and not by way of limitation, the first confidence score may range between 0.0 and 1.0. A score of 0.0 would indicate that there is a nearly zero percent chance that the recorded non-tactile input is the same as one of the reference signals. A score of 1.0 would indicate that there is nearly a one hundred percent chance that the non-tactile input is the same as one of the reference signals. The algorithms used for the first analysis may be dependent on the type (or types) of non-tactile inputs that have been recorded. By way of example, if the recorded non-tactile input is audio data, then the algorithms may utilize voice activity detection (VAD) algorithms or simple automatic speech recognition (ASR) algorithms; alternatively, if the recorded non-tactile input is video data, then the algorithms may utilize object recognition or gesture recognition algorithms. By way of example, and not by way of limitation, a very simple confidence measure may be implemented by performing motion detection, e.g., by analyzing an output from a motion detection sensor, before embarking on more complex object recognition.

Once a first confidence score has been calculated, process 200 continues to decision block 263 where the processor will determine if the first confidence score is above a first threshold value. The first threshold value should be set sufficiently high such that a minimal number of false positives are delivered to the next processing step. If the first confidence score is below the first threshold level, then process 200 may continue recording non-tactile inputs as described in block 261. In instances where the first confidence score is equal to or above the first threshold level, then process 200 may continue to block 264, where the low-power processor 147 initiates an intermediate-power state.

According to an aspect of the present disclosure, the sensor 146 may be a microphone and the first confidence score may be generated with a VAD algorithm. A VAD algorithm may be used to determine the presence or absence of a human voice in the recorded non-tactile input. The use of a VAD algorithm may be appropriate for generating the first confidence score at block 262, because if the non-tactile input does not contain a human voice, then it is unlikely that a person is trying to affirmatively initiate an operation on the client device platform 105. This use of a VAD algorithm is therefore desirable because it prevents excess analysis on audio data that is known to have no human voice present. Additionally, VAD algorithms require a relatively low number of CPU cycles and a low sampling of the recorded memory buffer. Also, the use of only a VAD algorithm reduces the data storage space needed for the storage of first reference signals, because the presence or absence of a voice is all that is required, instead of the actual words that are being spoken. As such, running a VAD algorithm will not substantially burden the client device platform 105 while in the low-power state. Further, a VAD algorithm may be implemented as a custom ASIC that is incorporated into, or provided in addition to, the low-power processor 147. If a recorded non-tactile input fails to have human voice present, then it may be assigned a first confidence score of 0.0 and therefore be below the first threshold level. As such, process 200 would revert back to block 261 and continue recording non-tactile inputs. If the recorded non-tactile input does have a human voice present, then it may be assigned a first confidence score of 1.0, and therefore be above the first threshold level. Process 200 may then continue on to block 264 where the low power processor instructs the client device platform 105 to initiate the intermediate-power state and proceeds accordingly.

However, according to additional aspects of the present disclosure, the first confidence score may be refined through the use of one or more additional algorithms. This may reduce the number of false positives that are allowed to proceed to block 264. By way of example, and not by way of limitation, the client device platform 105 may also utilize a simple ASR algorithm in addition to the VAD algorithm in order to detect if the human voice that has been detected is producing words that are similar to one or more of the first reference signals. Alternatively, the ASR algorithm may be used instead of the VAD algorithm.

A simple ASR algorithm, such as one that utilizes a Hidden Markov Model (HMM) and that does not utilize tone or auditory attention cues, requires only a minimal number of CPU cycles and may be executed with the low-power processor 147. Since an ASR algorithm is capable of determining the words that have been spoken, it will be capable of comparing the actual words spoken in the recoded non-tactile input to the words in the reference input. Therefore, a first confidence score may be assigned to the recorded non-tactile input that ranges between 0.0-1.0, instead of being limited to the extremes of 0.0 and 1.0.

In alternative implementations a purely keyword spotting algorithm for specific words, or emotion detection only, may be used in combination with or without speaker recognition or neural network or machine learning technologies.

It is noted that the VAD itself need not be binary and may have some level of confidence that lies on a continuous range between 0.0 and 1.0. Some noises such as musical instruments that are similar to human voices might cause the VAD to give an intermediate confidence level. There will still be a threshold applied to make a binary choice (voice or no-voice), but the VAD itself may produce a more continuous answer.

Once the first confidence score has been assigned, process 200 may then continue on to block 263 where the low power processor determines if the first confidence score is above or below the first threshold level and proceed accordingly.

According to an additional aspect of the present disclosure, the sensor 146 may be a video camera and the generation of the first confidence score may at block 262 may utilize an object recognition algorithm that detects if a human is present proximate to the client device platform. If there is no image of a human present in the video data, then the non-tactile input may be assigned a first confidence score of 0.0, and if there is a human present then the first confidence score may be 1.0. It is noted that the object detection algorithm itself need not be binary and may have some level of confidence that lies on a continuous range between 0.0 and 1.0. Some noises such as musical instruments that are similar to human voices might cause the VAD to give an intermediate confidence level. There will still be a threshold applied to make a binary choice (voice or no-voice), but the VAD itself may produce a more continuous answer. Additionally, the first confidence score may be refined by comparing the video data to a reference input that describes a physical motion. By way of example, the reference input may be a distinct gesture enacted by a human, such as, but not limited to the human waving their hand in front of their own face. A gesture recognition algorithm may then be used to determine if the desired motion of the hand moving in front of the face was recorded by the video camera. The similarity between the recorded non-tactile input and the reference signal may then be used to generate a first confidence score that is not limited to the extremes of 0.0 and 1.0. Therefore, fewer false positives may be advanced beyond block 263 in the process.

According to another additional aspect of the present disclosure, two or more sensors 146 may be utilized in order to record different types of non-tactile inputs that may be both compared to separate reference signals in order to generate the first confidence score. By way of example, and not by way of limitation, a first sensor 146 may be a microphone and a second sensor 146 may be video camera. Audio data may be recorded as a first non-tactile input and may be subsequently analyzed with a VAD algorithm, keyword spotting algorithm, simple ASR algorithm, or some combination of two or more of these. The audio analysis may produce a first audio confidence score. Additionally, video data may be recorded as a second non-tactile input and be subsequently analyzed with an object recognition algorithm, a gesture recognition algorithm, or both. The video analysis may produce a first video confidence score. The first confidence score may then be a combination of the first audio confidence score and the first video confidence score. By way of example, the two scores may be averaged, with equal weight being given to each, or with one score being weighted more heavily than the other. The combination of the two scores may provide a more trustworthy determination of whether a user affirmatively wanted to initiate a desired operation on the client device platform 105. For example, a non-tactile audio input may have a sufficiently high confidence score to be advanced to the next processing step, but the non-tactile video data may reveal that there is no human proximate to the client device platform 105. As such, the non-tactile audio input may have been produced by a source such as a radio or television, and therefore may be a false positive. By way of example, and not by way of limitation, a similar combined first confidence score may be calculated through the use of two or more first non-tactile inputs recorded by sensors such as, but not limited to, an infrared sensor, a terahertz sensor, a video camera, or a microphone.

According to additional aspects of the present disclosure, if the first confidence score is below the first threshold level, then the determination that the recorded non-tactile input was not an affirmative desire to initiate an operation on the client device platform may be double checked through the use of a challenge process. It is noted that too many items may fail the first confidence score. For example, in the case of audio, pretty much all noises may be reasonably expected to fail. To take this into account the challenge response may be gated at a higher level of confidence score or threshold. If the first confidence measure is continuous between 0.0 and 1.0, then the range can be split into ranges for rejection, challenge and acceptance. For example 0.0-0.5 will be rejected, 0.5-0.75 may require a challenge response and 0.75-1.0 will always be accepted for the next level.

A challenge process may be implemented with a client device platform 105 that is configured to output a signal that is detectable to a human when a non-tactile input has been recorded. The user may then perceive the signal outputted by the client device platform 105 and provide a non-tactile response input to confirm that they did intended to initiate an operation on the client device platform 105. By way of example, and not by way of limitation, the output signal that is detectable to a human may be a blinking light emitting diode (LED) located on the client device platform 105, or an audible sound such as a beep emitted by the client device platform 105. The non-tactile response input may be repeating the original non-tactile input, or it may be a confirmation phrase or gesture, such as saying "yes", or shaking your head up and down to indicate a yes, or a combination of a phrase and gesture. If the client device platform receives a valid response input, then it may override the first confidence score and advance to block 264 of process 200. The use of a challenge system may improve the accuracy of the system. While in the low-power state, there may not be enough CPU cycles to provide enough confidence that the recorded non-tactile input is substantially similar enough to a reference input to be assigned a first confidence score that is above the first threshold. However, with the challenge process the confidence that an operation was desired by a user may be increased without adding extra CPU cycles. The affirmative response by the user indicates to the client device platform 105 that they intended for some operation to be executed. Therefore, the recoded non-tactile input may be passed on for further analysis at the intermediate-power state to determine which specific operation was intended.

By way of example, the intermediate-power state that is initiated at block 264 may comprise instructing the client device platform 105 to begin providing power to a portion of the CPU 131 and allow access to a larger memory, such as the memory 132. A portion of the CPU 131 may be provided power by activating one or more of a plurality of processing cores in the CPU 131. Other portions of the client device platform such as a display 137 or a GPU may remain unpowered in order to conserve energy. The activation of a portion of the CPU 131 provides additional CPU cycles that may be used for a more thorough analysis of the recorded non-tactile input.

After the intermediate-power state has been initiated, process 200 continues to block 265 where a second confidence score is generated. One example of could be that initially only speech is processed in a low power mode. After the intermediate-power state, video and audio data may be processed in CPU 131 or sent to CPU 131' for further processing with more input of data. The confidence score can be calculated based on all data. The second confidence score corresponds to a degree of similarity between the recorded non-tactile inputs and one or more second reference inputs that are stored on the larger memory that may be accessible to the client device platform 105 in the intermediate-power state. The second reference signals may be the same as the first reference signals and also may include additional reference signals that would occupy too much space and therefore may not have been stored in the limited memory available in the low-power state. For example, in addition to the reference signal "Device on" that may be stored in the low power memory 148, a longer reference input such as, "Device on—play video game one" may be accessible in the intermediate-power state. As such, it may be possible to have reference signals that correspond to more complex operations, such as operations that do more than simply awaken the client device platform 105 from the low-power state. By way of example, and not by way of limitation, in addition to an operation that initiates a full-power state, the operation may also include instructions for the client device platform 105 to load a certain media title such as a video game, movie, or song, tune the client device platform 105 to a desired input or channel or any combination thereof. Further, the increased amount of memory space and processing power of the intermediate-power state may also allow for algorithms to be trained to identify a specific individual's voice or face. This may be beneficial because it may be used in order to execute an additional operation that instructs the client device platform 105 to load settings that have been associated with the identified individual. By way of example, and not by way of limitation, the settings may include a desired volume level, display settings, a login profile, or any combination thereof.

The second confidence score may be generated through the use of one or more additional algorithms. Since there are more CPU cycles available, these algorithms may be more robust and capable of more detailed analysis of the recorded non-tactile inputs. By way of example, and not by way of limitation, if the recorded non-tactile input is audio data, then the second confidence score may be generated with a high quality ASR, such as one that may incorporate the use of auditory attention cues, or by breaking the recorded speech into phonemes or by using an array and AEC of multi-channel data instead of single channel data in low power mode. If the recorded non-tactile input is video data, then the second confidence score may be generated through the use of facial recognition algorithms, or advanced gesture recognition algorithms. Additionally, if the recorded non-tactile include both audio and video data, then audio visual speech recognition (AVSR) algorithms may be used in combination with advanced ASR algorithms to more accurately analyze the non-tactile inputs. Other methods that may be used to in the intermediate-power state to improve the confidence score include, but are not limited to voice-speaker recognition, lip reading, gesture recognition, emotion recognition can be used, sound event detection (e.g., clapping, glass breaking, knocking, foot step, etc.).

After the second confidence score has been generated, process 200 may continue to decision block 266. At block 266 the client device platform may determine if the second confidence score is above a second threshold level. If the second confidence score is below the second threshold level, then the process 200 reverts back to the low-power state as shown by block 267 and continues recording the non-tactile inputs at block 261. If the second confidence score is equal to or above the second threshold level, then process 200 continues on to block 267 where a command signal is generated that instructs the client device platform 105 to executes the one or more operations that are associated with the reference signals that have been matched by the one or more recorded non-tactile inputs.

According to additional aspects of the present disclosure, there may be two or more intermediate-power states incorporated into process 200. Each subsequent intermediate-power state may allow for additional CPU cycles to process the non-tactile inputs. By way of example, a first intermediate-power state may comprise activating a single core of a multiple core CPU 131, and a second intermediate-power state may comprise activating one or more additional cores of the multi-core CPU 131. The additional intermediate-power states, may allow for more advanced algorithms to be used before assigning the subsequent confidence scores. This may reduce the number of false positives that would otherwise cause the client device platform 105 to initiate an operation in error.

Figure 3:
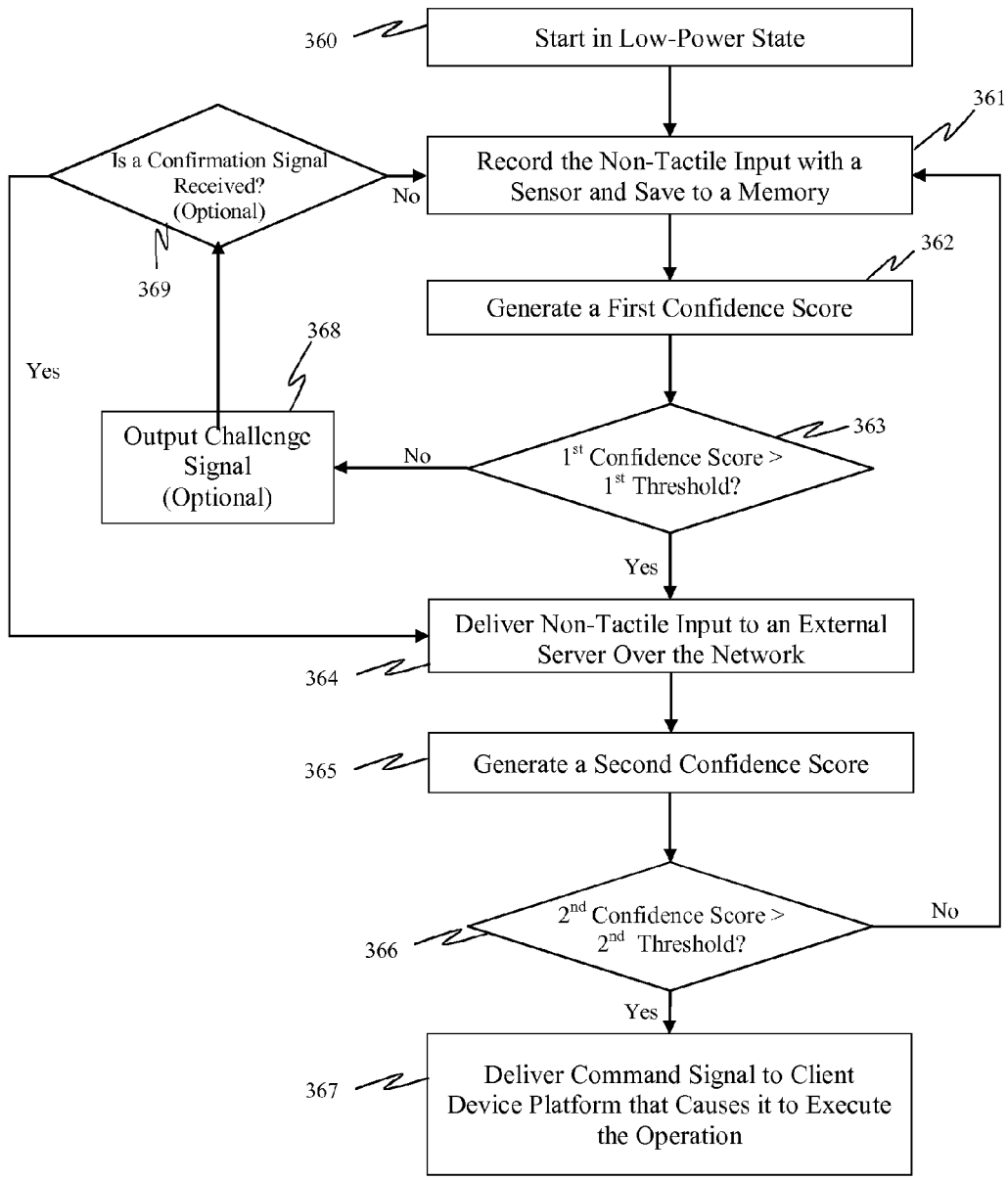
FIG. 3 is a flow diagram depicting a method of executing an operation while the client device platform is in a low-power state according to an additional aspect of the present disclosure.

FIG. 3 is a flow diagram describing a process 300 for implementing one or more operations that are initiated by a non-tactile input signal that is detected by the client device platform 105 while the client device platform 105 is in a low-power state, according to an additional aspect of the present disclosure. Process 300 is substantially similar to process 200 while operating in the low-power state until after decision block 363. When the first confidence score is equal to or above the first threshold level, the low-power processor delivers the recorded non-tactile inputs to a cloud based server 106 over the network 160, as indicated at block 364. The second confidence score is then generated by the cloud based server 106 at 365. The processor 131' on the cloud based server 106 may implement one or more algorithms in a manner substantially similar to those used in the generation of the second confidence score described in process 200. Using the processing power on the cloud based allows for the client device platform 105 to conserve power by remaining in the low-power state. The use of a cloud based server 106 for generating the second confidence score provides additional benefits as well. One such benefit is that that the memory 132' on the cloud based server 106 may be larger and therefore able to hold more reference inputs, thereby allowing for more a more diverse set of operations to be implemented with process 300. Additionally, since the reference signals are stored on the cloud, they may be updated more regularly since each client device platform 105 that may be connected to the cloud based server would not need to download new reference inputs each time they were changed. Real time data from someone else can be used to help improve the performance of a new user, for example.

Once the second confidence score has been generated, process 300 continues on to decision block 366. If the second confidence score is below a second threshold value then process 300 returns to block 361 and continues recording non-tactile inputs. When the second confidence score is above the second threshold value, process 300 continues to block 367. At block 367 the cloud based server 106 delivers a command signal to the client device platform 105 that will direct it to execute the one or more operations that are associated with the one or more reference inputs that were matched by the recorded non-tactile inputs.

In some implementations, a signal (e.g., an image of a face) may be sent to an appropriate mobile phone (e.g., a user's or a parent's) for verification to allow the powering up of the device or not. Alternatively, such an image may be sent to a security operator who is monitoring or protecting the house.

Figure 4:
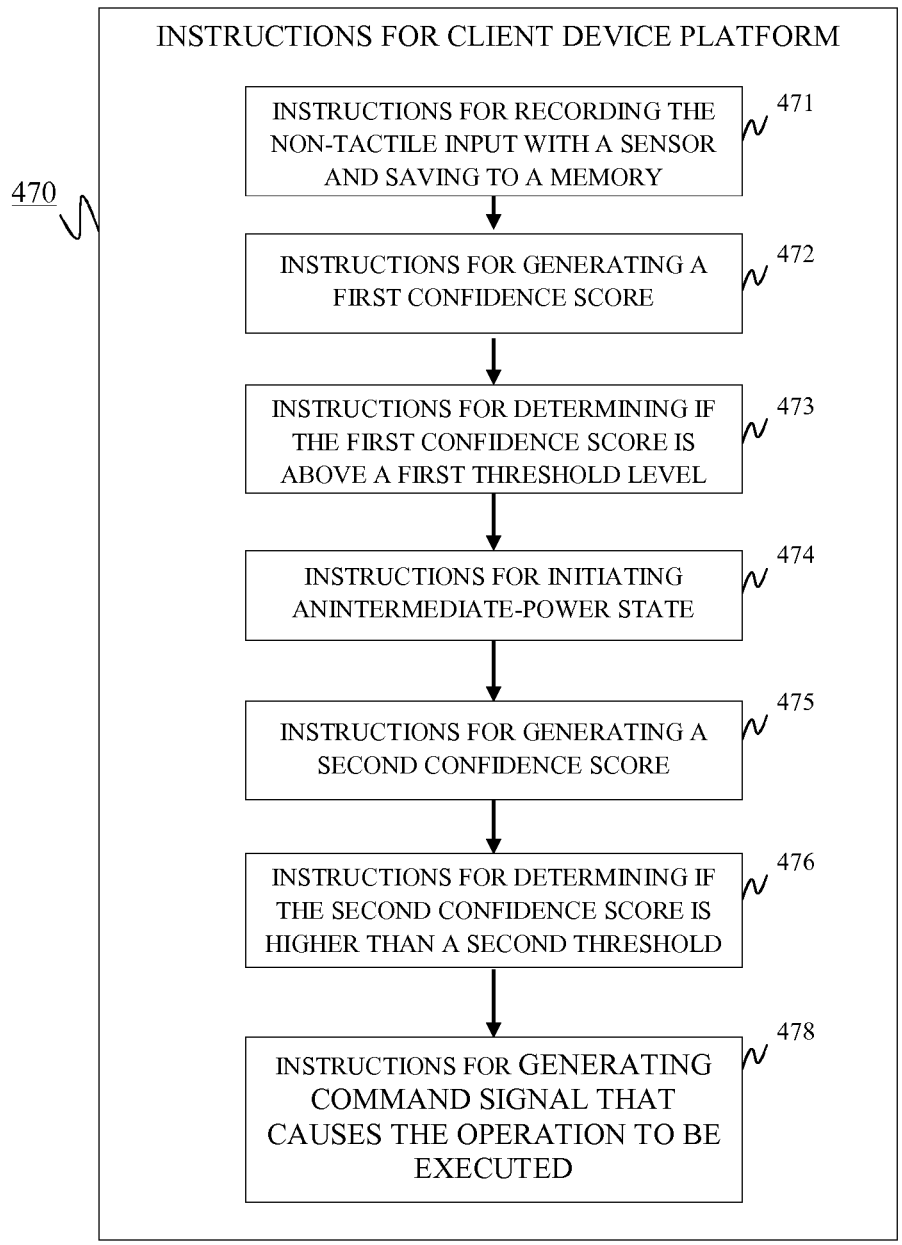
FIG. 4 is a diagram describing the instructions for executing an operation while the client device platform is in a low-power state according to an aspect of the present disclosure.

As shown in FIG. 4, a set of client device platform instructions 470 may be implemented, e.g., by the client device platform 105. The client device platform instructions 470 may be formed on a nontransitory computer readable medium such as the memory 132, the low-power memory 148, or the mass storage device 134. The client device platform instructions 470 may also be part of the process control program 133. The instructions include instructions for recoding the non-tactile inputs with a sensor 146 and saving them to a memory at 471. Next at 472, there may be instructions for generating a first confidence score. Thereafter, at 473, the client device platform 105 may be provided with instructions for determining if the first confidence score is higher than a first threshold level. Next, when the first confidence score is above the first threshold level, the client device platform may be instructed to initiate an intermediate-power state at 474. In the intermediate-power state, the client device platform 105 may be instructed to generate a second confidence score at 475. Next, there may be instructions for determining if the second confidence score is higher than a second threshold level at 476. Thereafter, the instructions 470 may include instructions for generating a command signal that causes the client device platform 105 to execute the one or more operations at 478.

Figure 5:
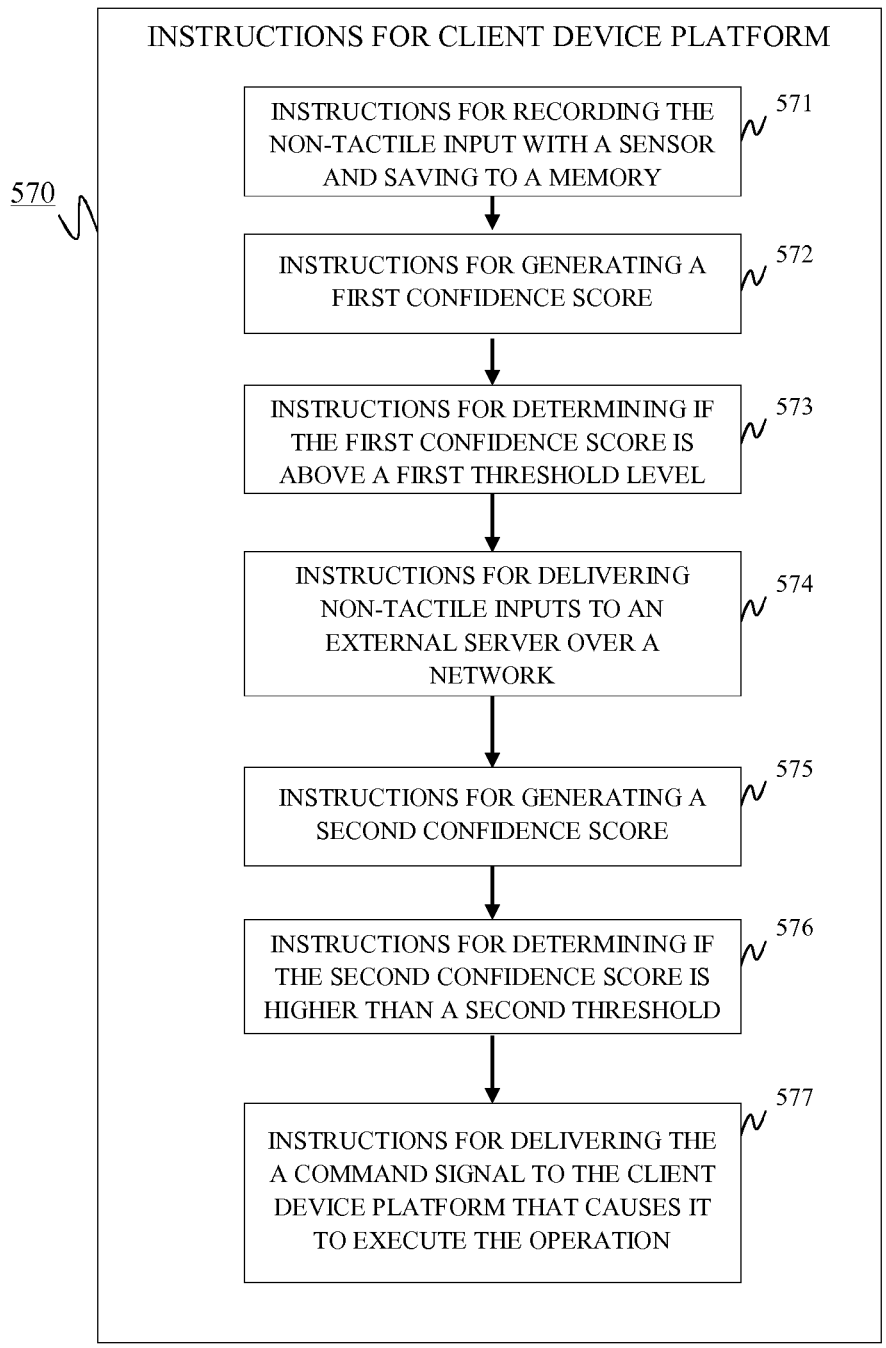
FIG. 5 is a diagram describing the instructions for executing an operation while the client device platform is in a low-power state according to an additional aspect of the present disclosure.

As shown in FIG. 5, a set of client device platform instructions 570 may be implemented, e.g., by the client device platform 105. The client device platform instructions 570 may be formed on a nontransitory computer readable medium such as the memory 132, the low-power memory 148, or the mass storage device 134. The client device platform instructions 570 may also be part of the process control program 133. The instructions include instructions for recoding the non-tactile inputs with a sensor 146 and saving them to a memory at 571. Next at 572, there may be instructions for generating a first confidence score. Thereafter, at 573, the client device platform 105 may be provided with instructions for determining if the first confidence score is higher than a first threshold level. Next, when the first confidence score is above the first threshold level, the client device platform 105 may be instructed to deliver the recorded non-tactile inputs to an external server over a network 160 at 574. The instructions 570 may then include instructions to generate a second confidence score at 575. Next, there may be instructions for determining if the second confidence score is higher than a second threshold level at 576. Thereafter, the instructions 570 may include instructions for delivering a command signal to the client device platform 105 over the network 160 that, upon receipt by the client device platform 105, causes it to execute the one or more operations at 477.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:

recording one or more non-tactile inputs to a device with one or more sensors, wherein the one or more inputs are recorded to a first memory, wherein the device is operating in a low-power state in which power is provided to a first processor and the first memory;

generating one or more first confidence scores, wherein each of the one or more first confidence scores is a measure of a degree of similarity between a corresponding recorded non-tactile input and a reference input stored in the first memory;

initiating an intermediate-power state of the device when the first confidence score is above a first threshold level, wherein the intermediate-power state comprises providing power to at least a second processor, wherein the second processor has a greater amount of available processing capability than the first processor;

outputting a challenge signal when the first confidence score is within a challenge range, and initiating the intermediate-power state when a response to the challenge signal is detected by one or more of the sensors;

generating one or more second confidence scores with the second processor, wherein each of the one or more second confidence scores is a measure of a degree of similarity between each recorded non-tactile input and a reference input;

generating a command signal that instructs the client device to execute one or more operations that are associated with the reference input when the second confidence score is above a second threshold.

2. The method of claim 1, wherein a first sensor of the one or more sensors is a microphone.

3. The method of claim 2, wherein generating the first confidence score comprises analyzing one or more of the non-tactile inputs with a voice activity detection (VAD) algorithm.

4. The method of claim 3, wherein the VAD algorithm is implemented by an application specific integrated circuit (ASIC).

5. The method of claim 2, wherein generating the first confidence score comprises analyzing one or more of the non-tactile inputs with an automatic speech recognition algorithm.

6. The method of claim 2, wherein generating the one or more first confidence scores comprises analyzing one or more of the non-tactile inputs with a voice activity detection (VAD) algorithm and an automatic speech recognition algorithm.

7. The method of claim 2, wherein a second sensor of the one or more sensors is configured to detect the presence of a human proximate to the client device platform.

8. The method of claim 7, wherein the sensor configured to detect the presence of a human proximate to the client device platform is a video camera.

9. The method of claim 7, wherein the sensor configured to detect the presence of a human proximate to the client device platform is an infrared camera.

10. The method of claim 7, wherein the sensor configured to detect the presence of a human proximate to the client device platform is a terahertz sensor.

11. The method of claim 2, wherein generating the one or more second confidence scores comprises analyzing one or more of the non-tactile inputs with an automatic speech recognition algorithm that utilizes phonemes.

12. The method of claim 2, wherein generating the second confidence score comprises analyzing one or more of the non-tactile inputs with an automatic speech recognition algorithm that utilizes auditory attention cues.

13. The method of claim 2, wherein generating the second confidence score comprises analyzing one or more of the non-tactile inputs with a voice recognition algorithm configured to identify the voice of a specific human.

14. The method of claim 1, wherein one of the one or more sensors is a video camera.

15. The method of claim 14, wherein generating the first confidence score comprises analyzing one or more of the non-tactile inputs with an object recognition algorithm.

16. The method of claim 15, wherein the object recognition algorithm is configured to detect the presence of a human proximate to the client device platform.

17. The method of claim 14, wherein generating the first confidence score comprises analyzing one or more of the non-tactile inputs with a gesture recognition algorithm.

18. The method of claim 14, wherein generating the second confidence score comprises analyzing one or more of the non-tactile inputs with an audio visual speech recognition (ASVR) algorithm.

19. The method of claim 1, wherein one of the one or more sensors is a motion sensor and wherein generating the first confidence score includes performing motion detection.

20. The method of claim 1, wherein the challenge signal that is detectable to a human is a blinking light emitting diode (LED).

21. The method of claim 1, wherein the challenge signal that is an audible tone configured to be detectable by a human.

22. The method of claim 1, wherein the non-tactile response input is an audible phrase.

23. The method of claim 1, wherein the non-tactile response input is a gesture.

24. The method of claim 1, wherein the intermediate-power state is implemented on a cloud based server.

25. The method of claim 24, wherein the one or more non-tactile inputs are delivered over a network to the cloud based server.

26. The method of claim 1, wherein the secondary processor is coupled to a second memory.

27. The method of claim 26, wherein the second memory comprises one or more reference signals that are not stored on the first memory.

28. The method of claim 1, wherein the first processor comprises one or more cores of a multi-core processor.

29. The method of claim 28, wherein the second processor comprises the first processor and one or more additional cores of the multi-core processor.

30. The method of claim 1, wherein one of the one or more the operations is configured to initiate a full-power state on the client device platform.

31. The method of claim 1, wherein one of the one or more the operations is configured to initiate the playback of a particular media title on the client device platform.

32. The method of claim 1, wherein one of the one or more the operations is configured to load a player profile.

33. A client device platform configured to operate on a network, comprising:

a processor;

a memory coupled to the processor;

one or more instructions embodied in memory for execution by the processor, the instructions being configured to implement a method, the method comprising:

recording one or more non-tactile inputs to a device with one or more sensors, wherein the one or more inputs are recorded to a first memory, wherein the device is operating in a low-power state in which power is provided to a first processor and the first memory;

generating one or more first confidence scores, wherein each of the one or more first confidence scores is a measure of a degree of similarity between a corresponding recorded non-tactile input and a reference input stored in the first memory;

initiating an intermediate-power state of the device when the first confidence score is above a first threshold level, wherein the intermediate-power state comprises providing power to at least a second processor, wherein the second processor has a greater amount of available processing capability than the first processor;

outputting a challenge signal when the first confidence score is within a challenge range, and initiating the intermediate-power state when a response to the challenge signal is detected by one or more of the sensors;

generating one or more second confidence scores with the second processor, wherein each of the one or more second confidence scores is a measure of a degree of similarity between each recorded non-tactile input and a reference input;

generating a command signal that instructs the client device to execute one or more operations that are associated with the reference input when the second confidence score is above a second threshold.

34. A nontransitory computer readable medium containing program instructions, wherein execution of the program instructions by one or more processors of a computer system causes the one or more processors to carry out the steps of:

recording one or more non-tactile inputs to a device with one or more sensors, wherein the one or more inputs are recorded to a first memory, wherein the device is operating in a low-power state in which power is provided to a first processor and the first memory;

generating one or more first confidence scores, wherein each of the one or more first confidence scores is a measure of a degree of similarity between a corresponding recorded non-tactile input and a reference input stored in the first memory;

initiating an intermediate-power state of the device when the first confidence score is above a first threshold level, wherein the intermediate-power state comprises providing power to at least a second processor, wherein the second processor has a greater amount of available processing capability than the first processor;

outputting a challenge signal when the first confidence score is within a challenge range, and initiating the intermediate-power state when a response to the challenge signal is detected by one or more of the sensors;

generating one or more second confidence scores with the second processor, wherein each of the one or more second confidence scores is a measure of a degree of similarity between each recorded non-tactile input and a reference input;

generating a command signal that instructs the client device to execute one or more operations that are associated with the reference input when the second confidence score is above a second threshold.

* * * * *